United States Patent [19]

Jeremias

[11] Patent Number: 4,606,679
[45] Date of Patent: Aug. 19, 1986

[54] CUTTING INSERT WITH CHIP CONTROL

[75] Inventor: Robert W. Jeremias, Royal Oak, Mich.

[73] Assignee: GTE Valeron Corporation, Troy, Mich.

[21] Appl. No.: 737,929

[22] Filed: May 28, 1985

Related U.S. Application Data

[63] Continuation-in-part of Ser. No. 527,318, Aug. 29, 1983, abandoned.

[51] Int. Cl.⁴ .......................... B23B 27/22; B26D 1/00
[52] U.S. Cl. ...................................... 407/114; 407/116
[58] Field of Search ................ 407/113, 114, 115, 116

[56] References Cited

U.S. PATENT DOCUMENTS

| | | | |
|---|---|---|---|
| 3,187,406 | 6/1965 | Franko | 407/114 |
| 3,213,716 | 10/1965 | Getts | 407/114 |
| 3,381,349 | 5/1968 | Newcomer | 407/114 |
| 3,395,434 | 8/1968 | Wirfelt | 407/114 |
| 3,399,442 | 9/1968 | Jones et al. | 407/114 |
| 3,733,664 | 5/1973 | McKelvey | 407/114 |
| 3,786,540 | 1/1974 | Lundgren | 407/114 |
| 3,786,541 | 1/1974 | Lundgren | 407/114 |
| 3,885,281 | 5/1975 | Stambler | 407/114 |
| 3,947,937 | 4/1976 | Hertel | 407/114 |
| 3,968,550 | 7/1976 | Gehri | 407/114 |
| 4,056,872 | 11/1977 | Seidel | 407/114 |
| 4,288,179 | 9/1981 | Kruger et al. | 407/114 |
| 4,367,990 | 1/1983 | Porat et al. | 407/115 |

FOREIGN PATENT DOCUMENTS

| | | | |
|---|---|---|---|
| 2407378 | 9/1974 | Fed. Rep. of Germany | 407/114 |
| 1379912 | 1/1975 | United Kingdom | 407/114 |
| 649508 | 2/1979 | U.S.S.R. | 407/114 |

*Primary Examiner*—Francis S. Husar
*Assistant Examiner*—Jerry Kearns
*Attorney, Agent, or Firm*—Lloyd M. Forster

[57] ABSTRACT

A cutting tool for improved chip forming material removal efficiency over a wide mid-range of typically used feed rates and depths of cut is disclosed in a preferred form of an indexable polygonal cutting insert. A first chip control groove of uniform width and cross section radius extends from a cutting edge at each side of the polygon and terminates inwardly from the edge in a second chip control groove having a cross section of larger radius but of lesser depth than that of the first chip control groove. The second groove has its largest width at a point substantially midway between adjacent cutting corners of the polygon and diminishes to zero width at the end of each straight cutting edge, the first groove continuing around a substantial corner radius adjoining adjacent ends of the straight portions of such grooves. Corner projections of the outer face of each side of the insert extend between adjacent ends of the second grooves providing a substantial mounting support for inserts incorporating chip control grooves in both major polygonal faces. The cutting edge along the side of the polygon is arcuate with its lowest point relative to a major face of the insert being substantially at a midpoint between each corner of the polygon.

6 Claims, 5 Drawing Figures

CUTTING INSERT WITH CHIP CONTROL

BACKGROUND OF THE INVENTION

This application is a continuation-in-part of my prior application Ser. No. 06/527,318 filed Aug. 29, 1983, and now abandoned.

FIELD OF THE INVENTION

The invention relates generally to cutting tools for machining chip forming materials. More particularly the invention concerns cutting inserts incorporating chip control geometry particularly advantageous over a mid-range of feed rates running between very low or finishing feed rates and relatively high feed rates.

DESCRIPTION OF THE PRIOR ART

Prior art identified in my prior application teaches chip control geometry for a cutting insert particularly useful for finishing cuts at relatively low feed rates; also additional prior art discloses chip control geometry particularly useful at relatively high feed rates. My prior application discloses an improved chip control arrangement suitable for use over a relatively wide mid-range of feed rates enabling use of cutting inserts of this invention in many applications previously requiring a switch from one design to another as one progresses over the encountered range of feed rates for such applications.

SUMMARY OF THE INVENTION DISCLOSED IN MY PRIOR APPLICATION

The invention is embodied in a preferred form as a fully indexable polygonal cutting insert for machining chip forming materials, the insert incorporating on both chip engaging surfaces thereof improved chip control including a first chip control groove of uniform width intersecting and running parallel to an arcuate cutting edge at each side of the polygon. A second chip control groove adjoins each first control groove and has a cross-section of larger radius but of less depth than the first chip control groove relative to the plane of the face of the insert. The second control groove has its largest width substantially midway between adjacent cutting corners of the polygon and gradually decreases to zero width near each corner in the area of the bisector of each cutting corner angle. Each arcuate cutting edge along the sides of the polygon has its lowest point relative to its associated insert chip engaging face substantially at the midpoint between adjacent cutting corners. Thus, each cutting edge presents a positive front to back rake angle but can be mounted in a negative rake tool holder. The resultant island area left in the chip engaging face inwardly of the second control groove provides adequate mounting support for inserts incorporating chip control grooves in both major polygon faces—i.e. double-sided, fully indexable inserts.

SUMMARY OF THE PRESENT FURTHER EMBODIMENT

In the preferred embodiment of my prior application each cutting corner is rounded off with a relatively small radius—e.g. a nominal radius of 0.031" in a triangular insert having a nominal diameter IC of 0.5". In the present embodiment a relatively larger corner radius is provided—e.g. typically up to 0.125".

In the earlier embodiment the island land surface has progressively narrowing projections terminating at a point located substantially on the bisector of the angle formed by each corner. In the present embodiment each corner includes an island land of relatively more substantial width accommodated by the larger corner radius and providing greater area of mounting support for each side of the reversible insert.

In the present embodiment the smaller groove is generated around the corners as well as along the edges with side form having a larger radius dip with lowest point at the center of edge length. The larger radius groove is relatively further inboard from the edge, having the same profile as the smaller groove, but terminating at a substantially greater distance from the corners as compared with the earlier embodiment. The smaller primary groove generated around the nose radius is altered slightly by the addition of a short straight groove of the same radius, at a small angle to the edge of the insert with its centerline starting and ending tangent to the centerline of the generated groove. This creates a straight portion on the inner edge of the chip groove, starting at the converging point of larger radius groove and dip and blending with generated groove at a point short of the corner angle bisector.

DETAILED DESCRIPTION OF THE PREFERRED EMBODIMENT

Figure 2:
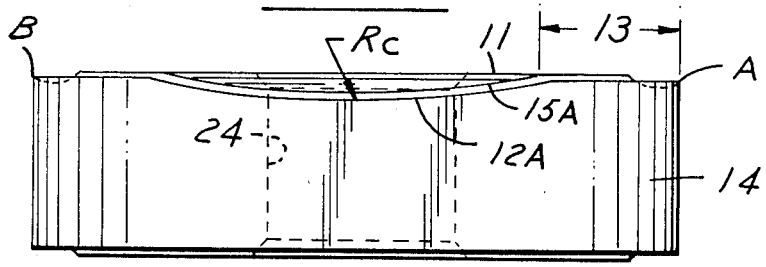
FIG. 2. is a side plan view of the insert of FIG. 1.

With reference to FIGS. 1-5, triangular indexable cutting insert 10 has upper and lower substantially parallel chip engaging rake faces, upper face 11 being bounded by arcuate cutting edges 12A extending between corners A and B, 12B extending between cutting corners B and C, and 12C extending between cutting corners C and A. As seen in FIG. 2, each arcuate cutting edge, such as 12A, has its lowest point relative to its associated chip engaging face substantially midway between its associated cutting corners A and B. In the vicinity of corners A and B, edge 12A extends for a distance 13 substantially parallel to but slightly lower than the plane of top chip engaging face 11 and then smoothly blends into a relatively large circular arc having radius Rc the side form of cutting edges 12A/B and C, as shown in FIG. 2 for edge 12A, creates a positive front to back rake angle. Side or flank faces 14 of insert 10 are substantially perpendicular to the top and bottom chip engaging faces. Hence, in preferred form, insert 10 is a so-called "positive-negative" insert—i.e. having cutting edges with positive front to back rake on a negative style insert body mountable in a negative rake style tool holder pocket.

Intersecting each arcuate edge and extending parallel thereto are first chip control grooves 15A, 15B and 15C, each having uniform width 16 and uniform radius R1. Grooves 15A and 15B are generated around corner B from their extremities along edges 12A and 12B. Grooves 15A and 15B as generated around corner B are each altered slightly by the addition of a short straight groove 17B, extending at a 45° angle relative to corner bisector 18 or 15° angle relative to adjacent groove 15B, resulting in a slight flat bottom 19B on one side of corner B with similar short straight groove 17A resulting in slight flat 19A on the other side of corner B. This description relative to corner B is typical and similarly incorporated at corners A and C.

Adjacent first grooves 15A, B, and C are second control grooves 20A, B and C formed with radius R2. Second groove 20A intersects groove 15A along substantially straight line boundary 21A with its innermost boundary 22A being arcuate such that groove 20A has its widest point 23 substantially midway between cutting corners A and B. Similarly, radial groove 20B intersects groove 15B along substantially straight line boundary 21B and has its widest point substantially midway between cutting corners B and C while radial groove 20C intersects groove 15C along substantially straight line boundary 21C and has its widest point 23 substantially midway between cutting corners C and A.

Unlike grooves 15A, B, and C, control grooves 20A, B, and C do not continue around or to the corners, but rather terminate substantially at the end of each straight groove 15A, B, and C and at the beginning of each short straight groove such as 17A and 17B.

The innermost arcuate boundaries 22A, B, and C of control grooves 20A, B, and C define an island having a surface 11 lying substantially in the plane of the top chip engaging surface of the insert. Island surface 11 has triangular projections 11A, B and C of substantial width, relative to the narrowing projections of the previous application embodiment and, as applied to both faces of the insert result in relatively increased mounting support surface at each major face thereby furnishing a double sided fully indexable triangular insert with six indexable cutting edges. In general polygonal inserts of the invention will have 2n indexable cutting edges where n is the number of sides of the polygonal shape used.

At the center of insert 10 cylindrical through hole 24 with countersunk portions 25 is provided for receipt of a suitably shaped insert mounting screw of a tool holder. Alternatively insert 10 could be of solid form for use in top clamp style tool holders.

Figure 1:
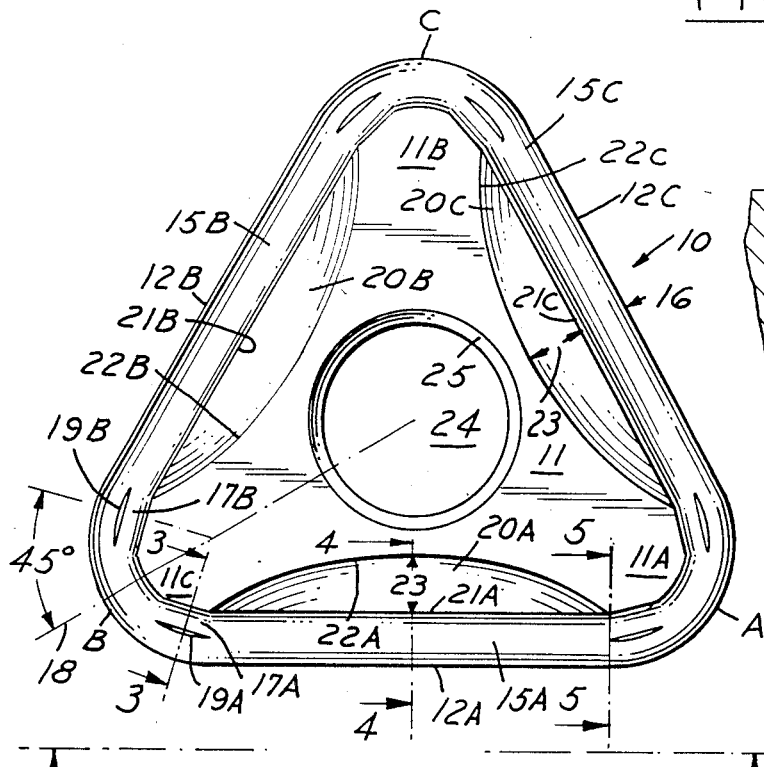
FIG. 1 is a top plan view of an insert design in accordance with present modified embodiment.
Figure 4:
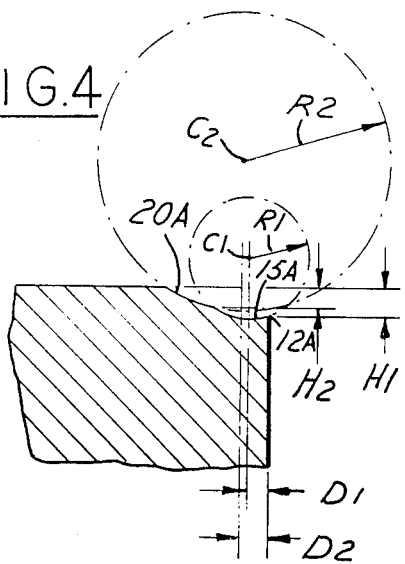
FIG. 4 is a sectional view taken along the line 4—4 of FIG. 1.

As shown in FIG. 4, each second groove such as groove 20A has a larger cross-sectional radius R2 than the cross-sectional radius R1 of its neighboring first groove 15A. The depth shown below surface 11, H2 of groove 20A is less than depth H1 for groove 15A. The centers of surface radii R1 and R2 are respectively shown at C1 and C2 and are seen to lie inside of cutting edge 12A in two respective vertical planes substantially parallel to a vertical plane containing to the cutting edge.

Center C2 lies closer to center of the insert than center C1, as seen from FIG. 4, and C2 is located at a distance D2 from the plane of cutting edge 12A while C1 is located a distance D1 therefrom. It will also be apparent than D2 is greater than D1.

Figure 3:
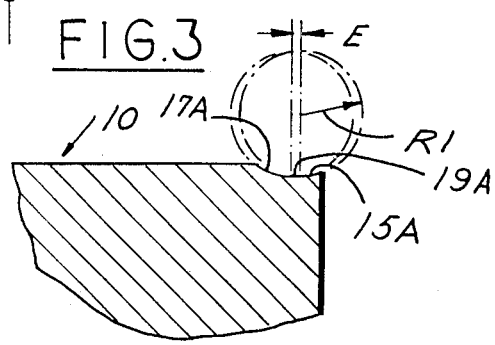
FIG. 3 is a cross sectional view taken along the line 3—3 of FIG. 1.
Figure 5:
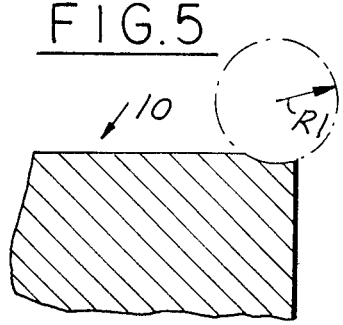
FIG. 5 is a sectional view taken along the line 5—5 of FIG. 1.

With reference to FIG. 3, the width of flat 19A extending between short straight groove 17A and first groove 15A is shown at E in somewhat exaggerated width which, in an actual construction for a 0.5 or 0.625 inch IC insert, may only extend to a 0.005" width. In constructing a prototype master, the short straight grooves such as 17A and 17B are added by secondary grinding operations with a small groove radiused grinder moved inwardly 0.005 inch and in a straight line—e.g. normal to section line 3—3 for the length of the groove 17A.

One example of a specific triangular insert successfully tested has an inscribed circle IC diameter of 0.5"; an insert thickness between top and bottom island surfaces of 0.192"; a cutting edge radius Rc of 1.12"; each corner A, B, C provided with an outer radius of 0.125"; a 0.050" uniform width 16 for each first or outer control groove; an inner or second groove maximum width 23 at its midpoint of 0.060"; typical values of 0.032" for dimension H1 and 0.024" for H2; 0.055" for R1 and 0.155" for R2; 0.022" for D1 and 0.030" for D2; and a straight line cutting edge dimension equal to the length of each second groove 20A, B, and C of 0.435".

Comparable dimensions for a second example having an inscribed circle IC diameter of 0.625" are the same as above with the exception of a thickness between top and bottom island surfaces of 0.255"; a cutting edge radius Rc of 1.70"; a maximum width 23 of 0.073"; H1, 0.040"; H2, 0.032"; and length of straight edges 12A, B and C and second grooves 20A, B, and C equal to 0.64".

These two embodiments are capable of shallow, intermediate and deep cuts—e.g. shallow, up to the width of the outer groove, 0.050"; intermediate, up to the end of the short straight section and beginning of the inner groove, 0.125"; and deep, up to the mid point of the cutting edge. or even more in some materials; at preferred feed rates in the range of 0.006" to 0.026"; with a maximum range from 0.003" to 0.050". Adequate chip breaking is provided by the outer groove alone for shallow cuts; the straight short portions such as 17A and 17B are important in providing satisfactory chip breaking control for intermediate depths; and the inner groove comes into control for the deeper cuts.

It has been found that with nose radii over 1/16" and up to ⅛", the short straight grooves, such as 17A and 17B are important, and that they extend to and converge with the beginning of the inner groove 20A, B and C for optimum performance over all depths of cut.

I claim:

1. In a tool for cutting chip forming materials having a substantially polygonal chip engaging surface and a continuous flank surface intersecting the chip engaging surface along each side of the polygon and at a cutting corner at each corner of the polygon, the improvement comprising:

an arcuate cutting edge extending between each pair of cutting corners having its lowest point substantially midway between each pair of cutting corners:

a first chip control groove surface formed in the chip engaging surface and having a first cross sectional radius, a substantially uniform width, and extending to a first depth below the plane of the chip engaging surface, the first control surface intersecting the cutting edge and extending parallel thereto along straight flank portions and around arcuate corners at adjacent ends of said straight portions, a second chip control groove surface formed in the chip engaging surface adjacent to and merging at its outer boundary with the inner boundary of the first control surface along said straight flank portions, the second control surface having a second cross sectional radius larger than the first cross sectional radius, a second depth less than the first depth, and a width varying from a maximum at a point substantially midway between each pair of cutting corners to zero width at the end of each straight flank portion of the polygon.

2. The improvement of claim 1 further comprising a planar island surface having projections of substantial width extending toward each cutting corner and terminating at each said arcuate corner groove.

3. An indexable cutting insert comprising a polygonal body having opposed parallel top and bottom planar faces, and a polygonal periphery formed by side surfaces substantially perpendicular to the parallel planes, pairs of straight side surfaces terminating at arcuate cutting corners of the polygon wherein arcuate cutting edges extending along straight side surfaces between adjacent pairs of cutting corners each edge of which has its lowest point substantially midway between the pair of cutting corners, first chip control groove surfaces formed around the periphery and having a first cross sectional radius of substantially uniform width and extending to a first depth below the planar faces, the first control surfaces intersecting each cutting edge, extending parallel thereto, and extending around each arcuate cutting corner, and second chip control groove surfaces extending adjacent to and merging at its outer boundary with an inner boundary of each first control surface, and having a second cross sectional radius larger than that of the first control surface cross sectional radius, and a second depth less than that of the first control surface depth, and a width varying from a maximum at a point substantially midway between the pair of cutting corners to zero width at the end of each straight portion of said side surfaces.

4. The improvement of claim 3 further comprising planar island surfaces bounded by the inner boundaries of the second control surfaces having projections of substantial width extending toward each cutting corner and terminating at each said arcuate corner groove.

5. The cutting insert of claim 3 further comprising a short straight groove portion on the inner edge of each first control groove surface starting at each end of each second control surface, and with its centerline starting and ending at the centerline of the arcuate corner groove, and terminating at a point short of corner angle bisector.

6. The cutting insert of claim 5 wherein said short straight groove includes a slight flat coextensive bottom.

* * * * *